United States Patent [19]

Hymes

[11] Patent Number: 5,280,314
[45] Date of Patent: Jan. 18, 1994

[54] FILM STREAMER CUING SYSTEM AND PROJECTION SYSTEM

[76] Inventor: Ron Hymes, 14758 Callally Ct., Canyon Country, Calif. 91351

[21] Appl. No.: 871,361

[22] Filed: Apr. 20, 1992

[51] Int. Cl.$^5$ .............................................. G03B 21/00
[52] U.S. Cl. .................................... 352/129; 352/5
[58] Field of Search ................................... 352/5, 129

[56] References Cited

U.S. PATENT DOCUMENTS

| | | |
|---|---|---|
| 1,027,248 | 5/1912 | Greenbaum . |
| 1,286,638 | 12/1918 | Hopkins .................. 352/5 |
| 1,489,794 | 4/1924 | Stalling ................... 352/5 |
| 2,002,188 | 5/1935 | Ross ....................... 352/5 |
| 2,092,931 | 9/1937 | Regan et al. . |
| 2,277,438 | 3/1942 | Humphreys . |
| 3,049,965 | 8/1962 | Gunst . |
| 3,199,115 | 8/1965 | Lasky ..................... 352/5 |
| 3,238,293 | 3/1966 | Hartman . |
| 3,309,163 | 3/1967 | White ................... 352/131 |
| 3,539,250 | 11/1970 | Johnston ............... 352/107 |
| 3,603,673 | 9/1971 | Charlap et al. .......... 352/5 |
| 3,740,125 | 6/1973 | Harris ................... 352/17 |
| 3,743,391 | 7/1973 | White ..................... 352/5 |
| 3,743,397 | 7/1973 | Soul ...................... 352/129 |
| 3,995,946 | 12/1976 | Greenberg .............. 352/129 |
| 4,053,214 | 3/1976 | Brucat ................... 352/191 |
| 4,067,049 | 1/1978 | Kelly et al. ............. 360/14 |
| 4,136,936 | 1/1979 | Roe ....................... 352/129 |
| 4,141,629 | 2/1979 | Mattes .................... 352/27 |
| 4,181,410 | 1/1980 | Sicha et al. ........... 352/91 R |
| 4,214,278 | 7/1980 | Hunt et al. ............. 360/14 |
| 4,277,152 | 7/1981 | Taylor ................... 352/17 |
| 4,351,007 | 9/1982 | Youngquist ............ 360/13 |
| 4,438,464 | 3/1984 | Odaka ................... 360/13 |
| 4,453,809 | 6/1984 | Hill et al. ............. 352/11 |
| 4,483,599 | 11/1984 | Macrae et al. ........... 352/5 |
| 4,792,867 | 12/1988 | Komori .................. 360/13 |
| 4,819,087 | 4/1989 | Takeuchi et al. ....... 360/14.3 |
| 4,839,733 | 6/1989 | Karamon et al. ...... 358/341 |
| 4,858,033 | 8/1989 | Chippendale .......... 360/14.2 |
| 4,972,274 | 11/1990 | Becker et al. ......... 360/14.1 |
| 5,018,027 | 5/1991 | Roggendorf ........... 360/14.2 |
| 5,060,086 | 10/1991 | Otto et al. ............. 360/14.1 |

*Primary Examiner*—Monroe H. Hayes
*Attorney, Agent, or Firm*—Lewis Anten

[57] ABSTRACT

A projection system for visual motion picture cues. To assist the engineer in the process of audio dubbing and the like by allowing the engineer to anticipate the precise moment that a cue point will occur, a cue is visually presented on the motion picture projection screen. Also, information may be presented to the engineer by the projection system. Synchronization signals are coordinated with engineer/operator input and the resulting signal is digitized. The digitized signals are transmitted via fiber optics to a slave circuit with changes the digital signals to analog signals. The analog signals are amplified and are used to drive mirrors, motors, and/or galvanometers that reflect and control incident laser light. The laser light is projected and superimposed upon a projection screen upon which the motion picture film.

17 Claims, 17 Drawing Sheets

5A      5

5,280,314

FILM STREAMER CUING SYSTEM AND PROJECTION SYSTEM

BACKGROUND OF THE INVENTION

1. Field of the Invention

This invention relates to audio-visual editing equipment, and more especially to a projection system for motion picture editing that provides the operator/engineer with both a cuing system and an informational display system.

2. General Background Information

The present invention relates to a visual cuing system used in dubbing sound into a film audio track by a mixing engineer which enables the mixing engineer to anticipate the precise moment that a cue point will occur, at which time the engineer takes the appropriate action. This system is analogous to the starting lights used for drag racing, in that they allow the driver to anticipate the green light, or cue point.

The prior method of visual cuing required the engineer to stop the film projector at the desired cue point. The projectionist then unthreaded several feet of film from the projector. A very gradually sloping, diagonal line, was drawn across the film, typically with a grease pencil. The film was then reloaded, rewound, and played back. When the diagonal line crossed in front of the lens, it cast a shadow on the motion picture projection screen which appeared as a vertical line sweeping from left to right. Several attempts could be required to obtain the precise desired cue point indicator.

The present invention creates an easily seen, vertical column of light that sweeps across the motion picture projection screen, without defacing the film, and in a highly adjustable and convenient manner. In the preferred embodiment, prior to the desired cue point, the vertical column of light sweeps left to right at a constant velocity and is timed to arrive at the far right side of the screen at the moment of the desired cue point. By watching the sweep rate and the travel distance remaining, the mixing engineer is able to accurately anticipate the arrival time of the cue point and respond in an appropriately timely manner, such as by mixing in proper sound effects or the like.

SUMMARY OF THE INVENTION

The present invention has discrete components operating in tandem to provide an optical, as opposed to a mechanical, cuing system. The optical cuing system of the present invention allows for spontaneous, or "on the fly", execution and adjustment of the optical cues, as well as entry of pre-determined cue points for which the optical cue signal will occur.

Central to the present invention is an accurate meter that gauges the current location of the film. Two standards are present in the industry for film location signals: regular film displacement by tachometer and absolute reference signals incorporated into the film and known in the industry as SMPTE signals.

The central meter emits signals that synchronize not only the cuing system of the present invention, but also other events that are or need to be coordinated with film and the sequence of events displayed in the projection of the film.

The synchronization signals from the central meter are connected to a master control that implements the commands entered by the engineer.

OBJECTS OF THE INVENTION

It is an object of this invention to provide a better cuing system for editing motion pictures.

It is another object of this invention to provide a cuing system for motion picture film editing that is more flexible and easier to use.

These and other objects and advantages of the present invention will be apparent from a review of the following specification and accompanying drawings.

DESCRIPTION OF THE PREFERRED EMBODIMENTS

Figure 1:
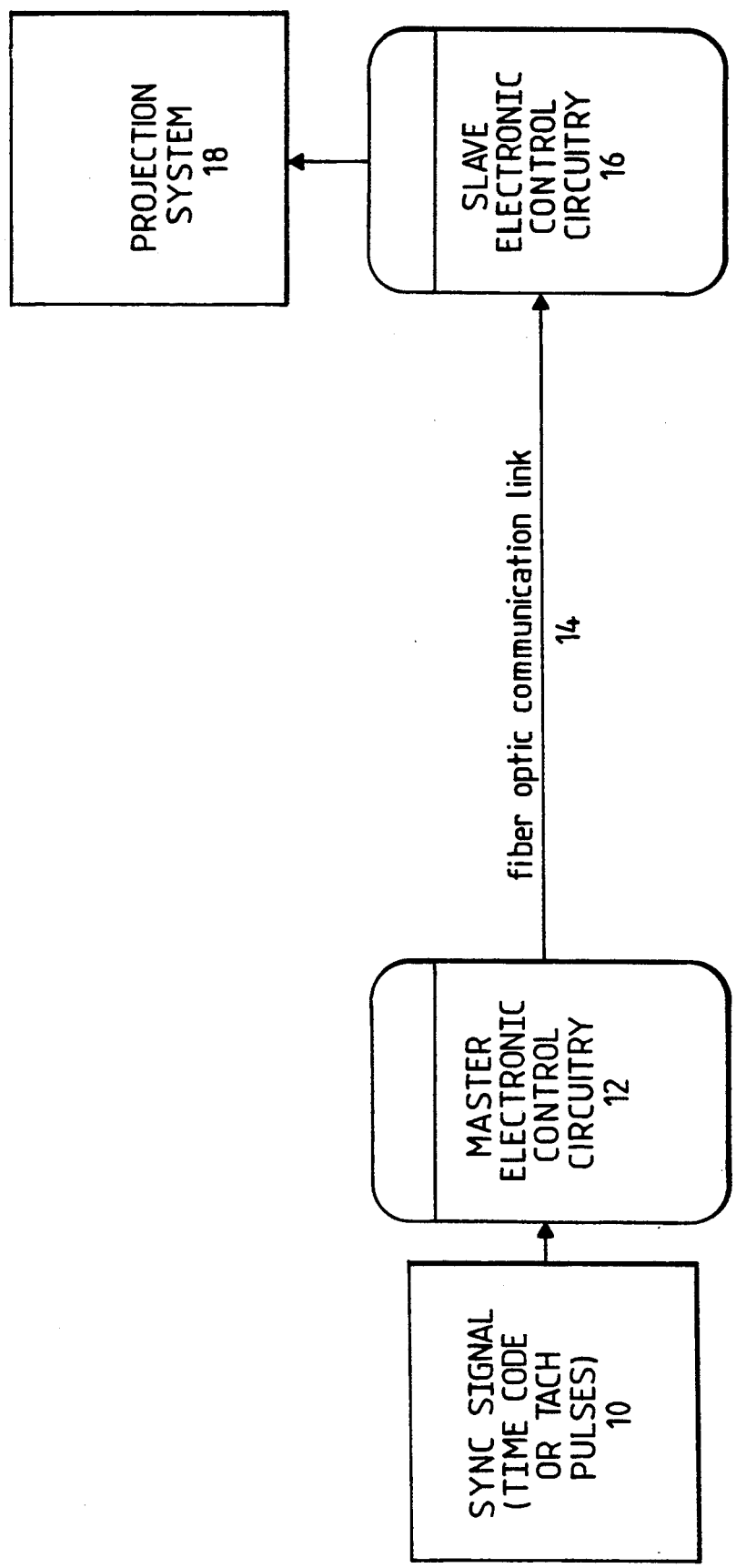
FIG. 1 is a block diagram of the film streamer of the present invention.

Referring to FIG. 1 of the drawings, which is a block diagram of the present invention, the major components are shown in relation to each other, as well as in relation to studio supplied signals. The system of the present invention has the following major components; the externally provided synchronization signals 10 emitted by the central meter (not shown), a master electronic control circuit 12, a duplex fiber optic communications link 14, a slave electronic control circuit 16, and a projection system 18.

The master control circuit 12 receives synchronization signals 10 from the central meter. These synchronization signals are used to determine at what point the visual cue is to sweep across the projection screen. Input from the engineer is received by the system at the master control circuit 12. Any commands received necessary to control the projection system are passed from the master control circuit 12 which digitizes the commands to the slave control circuit 16 via the fiber optic link 14. Upon receiving the digitized commands, the slave control circuit 16 appropriately controls the projection system 18 in order to elicit from it the appropriate cuing response.

Master Electronic Control Circuitry

Figure 2:
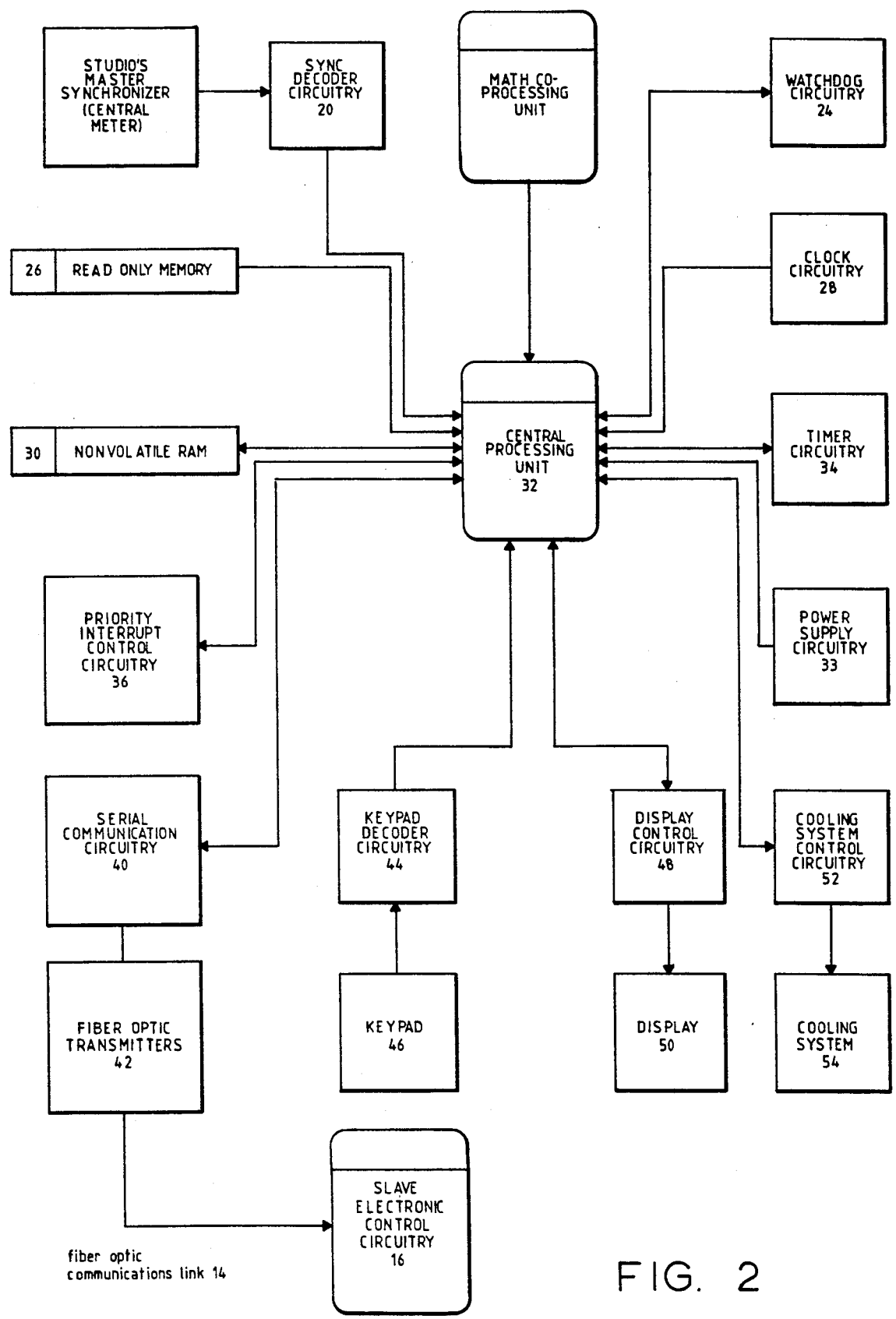
FIG. 2 is a block diagram of the master electronic control circuitry of the film streamer of FIG. 1.

Referring to FIG. 2 of the drawings, which is a block diagram of the master control circuit 12, the major components are shown to be: a synchronization signal decoder circuit 20, a math co-processing unit 22, a watchdog circuit 24, some read only memory 26, a clock 28, some nonvolatile random access memory 30, a central processing unit 32, a timer 34, a priority interrupt control 36, a power supply 38, a serial communications port 40, fiber optic transmitters 42, a keypad decoder 44, a keypad 46, a display control 48, an operator display 50, a cooling system control 52, and a cooling system 54.

The master control circuit 12 receives external input in the form of synchronization signals from the studio's master synchronizer or central meter. The synchronization or "sync" signal can be in the form of SMPTE Time Code or pulse and direction signals derived from a tachometer or optical encoder. These signals are generated by the travel of the film through the projector and provide a way to synchronize events in relation to the film.

The sync signal is pre-processed by the syn decoder circuitry 20. The sync decoder 20 is used to maintain "frame lock" or frame by frame synchronization of the master control circuit 12 with the film and is typically present within all studio equipment connected to the master synchronizing central meter.

The central processing unit 32 communicates with the math co-processing unit 22 which performs most of the mathematical calculations for the master control circuit 12, the remainder being performed in software stored in memory. Many of the mathematical operations related to the master control circuit concern offset calculations regarding other film locations relative to the current film location.

The watchdog circuit 24 is also connected to the central processor 32 to prevent it from running away or losing its place within the software. If the central processor loses its place, the watchdog circuit 24 prevents the master control circuit 12 from continuing with its operations by stopping the operations of the central processor 32, displaying an error message, and possibly providing some means of error recovery.

The central processor 32 is also connected t the clock 28 to receive clock signals to maintain internal timing, data and address bus synchronization, and proper serial communications rate.

The central processor 32 is connected to the timer 34 which controls the duration of various timed events. The central processor 32 is connected to the read only memory 26 so that the central processor 32 may retrieve the instructions which comprise the software program. The central processor 32 is connected to the nonvolatile ram 30 which saves and retrieves system parameters, variables, and other more transient information than that stored in the read only memory 26.

The central processor 32 is connected to the priority interrupt control 36 which identifies and prioritizes multiple sources of interrupts for servicing by the central processor 32. The priority interrupt control 36 ensures that low priority interrupts do not control the central processor 32 to the disadvantage of the higher priority interrupts.

The central processor 32 is connected to a serial communications port 40 which converts parallel data to be transmitted from the master control 12 into serial data for the slave control 16, as well as creating start bits, stop bits, and parity bits that accompany and help ensure integrity for the serial data. The serial output from the serial communications port 40 is transmitted to the fiber optic transmitters 42 which convert the serial data into pulses of light for transmission over the fiber optic communications link 14 to the slave electronic control circuit 16.

Input to the master control 12 and the system generally is taken from the keypad decoder 44 which converts a keystroke from the keypad 46 into a unique binary number for system recognition. According to the decoded key signal, the central processor 32 can queue the input until a completed command sequence is entered or can act upon a single stroke under appropriate circumstances The display control 48 is connected to the central processor 32 and processes all commands, information, and data to be displayed by the operator display 50 which is connected to the operator display control 48. Through the display, current commands and current system status can be monitored as well as other pertinent information displayed. As is set forth in more detail below, the information presented by the display can also be projected (in whole or in part) upon the motion picture screen, superimposed upon the projected image.

The cooling system control 52 is connected to the cooling system 54 and thermostatically controls it. The cooling system control 52 is connected to the central processor 52 so that the central processor may exercise some control over the cooling system control 52. In order to maintain proper internal operating temperature, the cooling system control can transmit current thermal information to the central processor 32. Should the temperature become too great, the central processor 32 can signal the cooling system control to activate the cooling system in order to reduce the temperature of the master control circuit to an appropriate level 12.

The power supply circuitry 38 supplies the proper voltages to all of the components of the master control circuit 12 and is shown as doing so through its connection with the central processor 32.

Slave Electronic Control Circuitry

Figure 3:
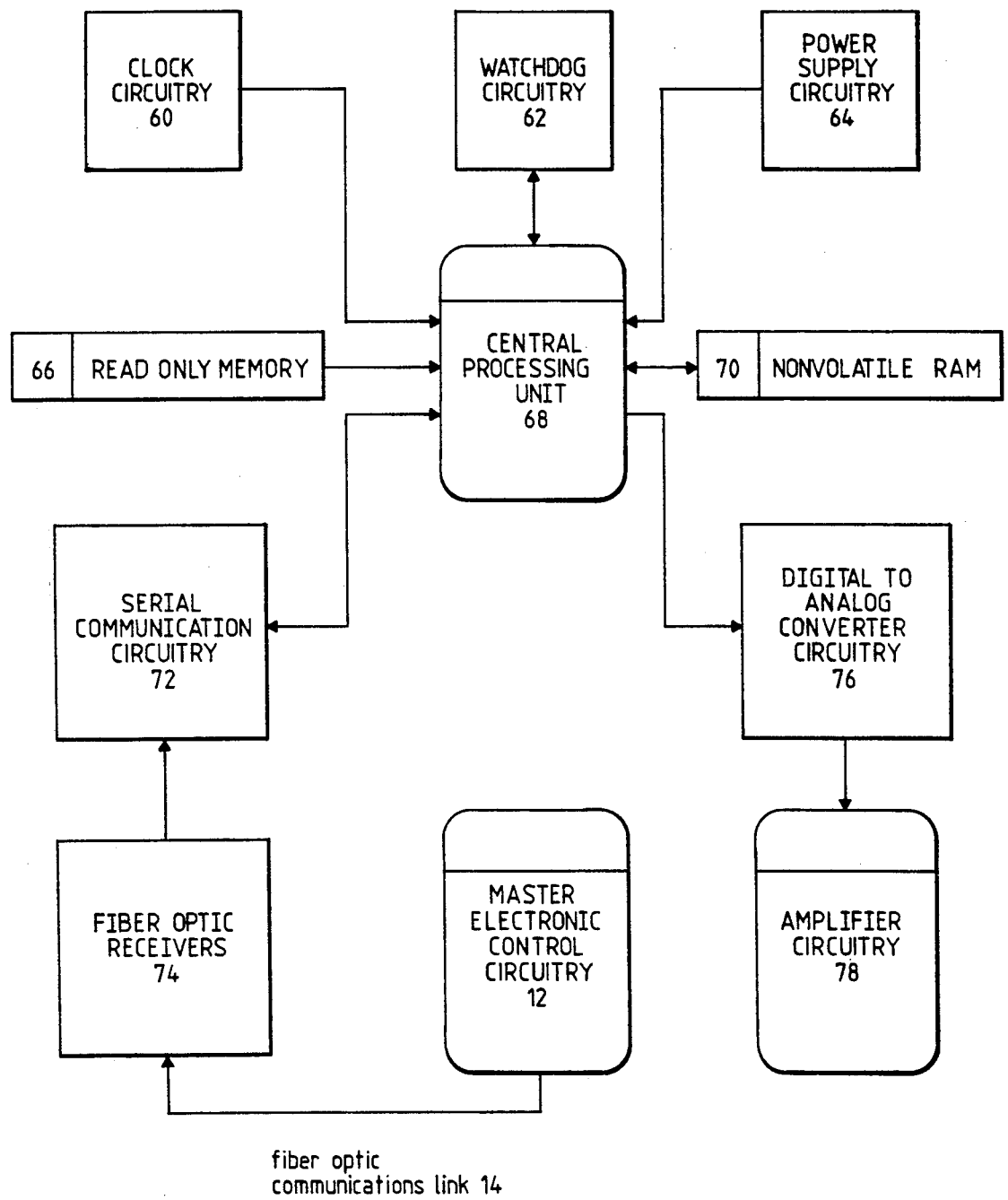
FIG. 3 is a block diagram of the slave electronic control circuitry of the film streamer

Referring to FIG. 3 of the drawings, which is a block diagram of the slave electronic control circuit 16, the major components are shown to be: a clock 60, a watchdog circuit 62, a power supply 64, some read only memory 66, a central processing unit 68, some nonvolatile ram 70, a serial communications port 72, fiber optic receivers 74, a digital to analog converter 76, and an amplifier circuit 78.

The slave control 16 receives external serial input in the form of commands and data from the master control circuit 12. This input is received over the duplex fiber optic communications link 14 and is converted from pulses of light to serial data by the fiber optic receivers 74. This serial data is checked for start bits, stop bits, and parity bits to ensure data integrity. The serial data is then converted into parallel data by the serial communications port 72. This parallel data, representing commands and data from the master control 12 is sent to the central processing unit 28 for processing.

The central processing unit 68 communicates with most of the other structures of the slave control 16.

The watchdog circuit 62 is connected to the central processor 68 and prevents the central processing unit 68 from running away or losing its place within the software, with respect to the master control circuit 12, and/or with the master synchronization meter signals 10. Should such an error occur, the slave watchdog circuit 62 interrupts the central processor 68 and prevents it from further processing.

The clock circuitry 60 is connected to the central processor 68 so that the central processor 68 can receive clock signals and maintain internal timing, data and address bus synchronization, and the proper serial communications rate.

The read only memory 66 is connected to the central processor 68 so that the central processor 68 can retrieve the instructions which comprise the software program for the slave control 16.

The central processor 68 is connected to the nonvolatile ram 70 so that system parameters and variables may be saved and retrieved by the central processor 68. The digital to analog converter circuitry 76 is also connected to the central processor 68 and converts digital galvanometer position data and intensity data into linear, proportional analog signals that can drive and control electromechanical devices. The amplifier circuit 78 is connected to the digital to analog converter 76 and boosts the analog galvanometer signals to levels matching those required by the projection system 18.

The power supply circuitry 64 supplies the proper voltages for all the components of the slave control 16 which is represented by the connected with the central processor 68.

Projection System

Figure 4:
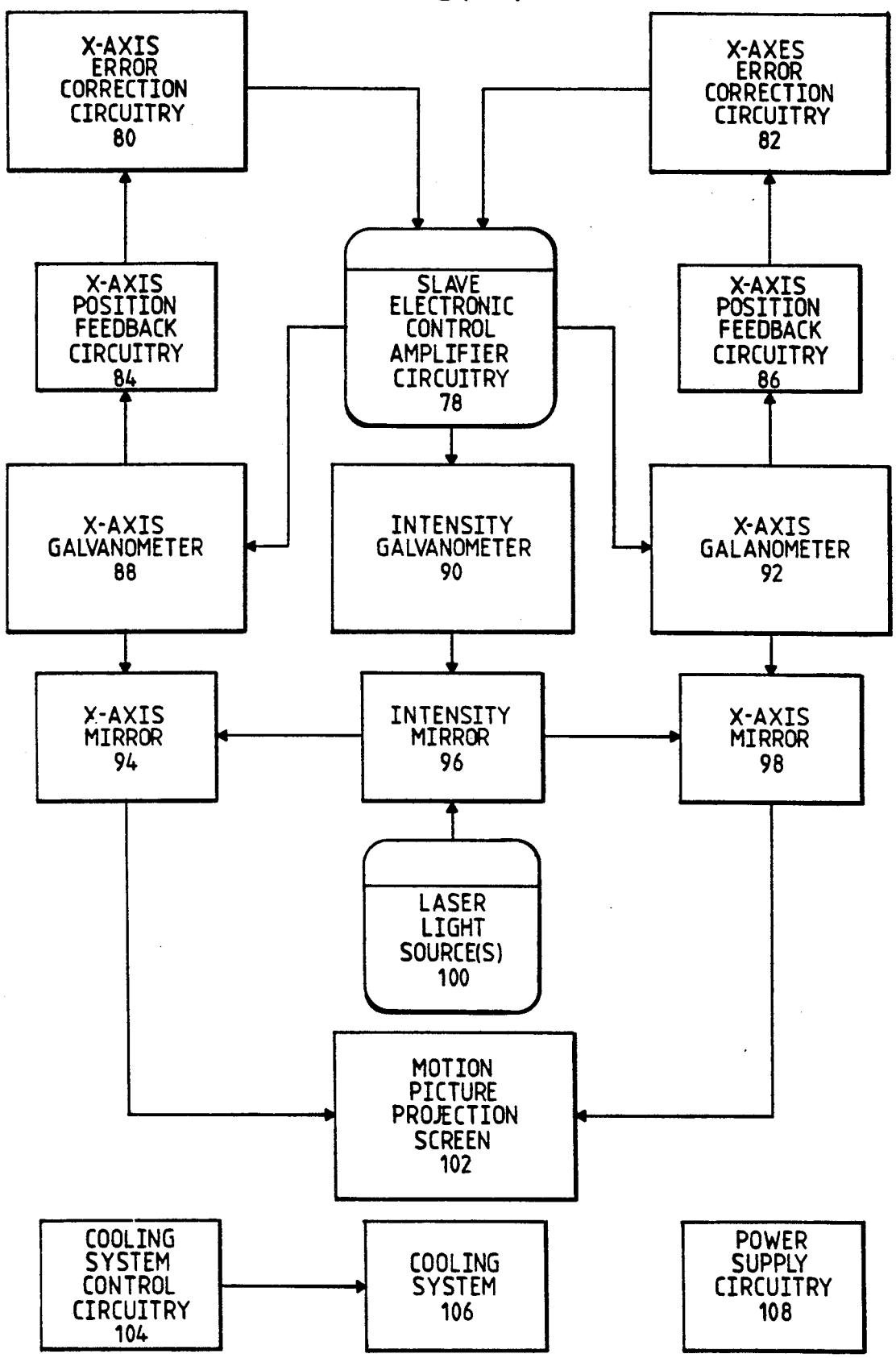
FIG. 4 is a block diagram of the Projection System of the film streamer.

FIG. 4 is a block diagram of the projection system 18. The major components of the projection system 18 are: an amplifier circuit 78 (which is the same amplifier 78 shown in FIG. 3 for the slave control), an x-axis error correction circuit 80, a y-axis error correction circuit 82, an x-axis position feedback circuit 84, a y-axis position feedback circuit 86, an x-axis galvanometer 88, an intensity galvanometer 90, a y-axis galvanometer 92, an x-axis mirror 94, an intensity mirror 96, a y-axis mirror 98, laser light source(s) 100, a motion picture projection screen 102, a cooling system control circuit 104, a cooling system 106, and a power supply circuit 108.

The projection system 18 receives input in the form of analog galvanometer position and intensity data from the slave control amplifier circuit 78. The amplifier is connected to the x-axis galvanometer 88, the y-axis galvanometer 92, and the intensity galvanometer 90. The position data is supplied to the x-axis galvanometer 88 and the y-axis galvanometer 92 from the amplifier circuit 78, while the intensity data is supplied to the intensity galvanometer 90.

These galvanometers respond by respectively actuating the x-axis mirror 84, the y-axis mirror 86, and the intensity mirror 96, which are connected to their corresponding galvanometers. The galvanometers send their corresponding mirrors to their commanded positions in a very quick and accurate manner. The intensity mirror 96 blocks the image to be displayed from 0% t 100% allowing the laser beam or other light source to be faded or blanked while moving between portions of the image.

The x-axis mirror 94 and the y-axis mirror 98 are monitored for position by the x-axis position feedback circuit 84 and the y-axis position feedback circuit 86, respectively The x-axis position feedback data and y-axis position feedback data are supplied to the x-axis error correction circuit 80 and the y-axis error correction circuit 82, respectively, for generation of error correction signals The x-axis error correction signals and y-axis error correction signals are supplied to the slave control amplifier 78 for summation with the x-axis position data and y-axis position data respectively. This completes the closed loop feedback control of the x-axis galvanometer 88, the y-axis galvanometer 92, and the intensity galvanometer 90.

The cooling system control 106 thermostatically controls the cooling system 104. The power supply circuit 108 supplies the proper voltages to all the components of the projection system 18. These systems are similar to the corresponding systems in the master 12 and slave 16 controls.

Figure 12:
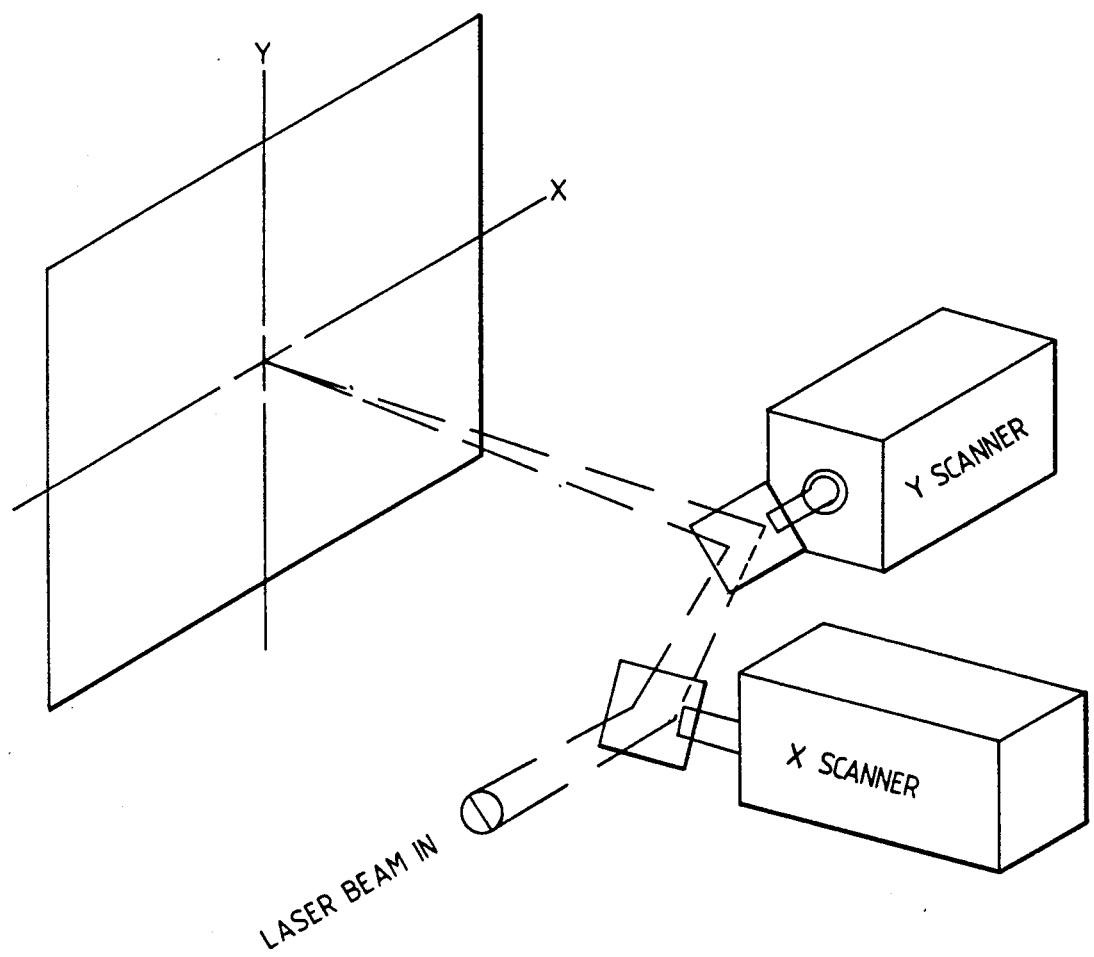
FIG. 12 is a perspective view of the x-axis and y-axis galvanometers with their mirrors.

As contemplated in the preferred embodiment of the present invention, and as shown in FIG. 12, the galvanometers used to control the laser light are limited-rotation, servo-motors that are specifically designed for highly linear torque and deflection characteristics over a relatively large angle. The galvanometers control the orientation of the mirrors through an angle at least large enough so that the laser light can be projected anywhere upon the motion picture screen 102.

The galvanometers are very quick to respond to input signals so that they have a fast dynamic response. To achieve this response, a high torque to inertia ratio is usually required which means that for whatever driving impulse the galvanometers are able to generate, the load which they drive (in this case the mirrors) should be very light.

The galvanometers can address and hold desired angular positions so that if, for example, a vertical streamer line is to be generated by the galvanometer/-mirror configuration of the present invention, the y-axis mirror 98 would be rapidly oscillated by the y-axis galvanometer 92 to generate a vertical line along the y-axis of the motion picture screen 102. If the x-axis mirror 94 were set and retained in a certain position, the vertical streamer line would be maintained at the same place on the motion picture screen 102. In order to move the vertical streamer line so generated by the y-axis mirror, the x-axis mirror 94 would be slowly moved so that the vertical line generated by the y-axis mirror 98 travelled from the left side of the motion picture screen 102.

The intensity galvanometer 90 controls the percent transmission or brightness of the initial laser light to the motion picture screen 102. If a diminished brightness of laser light is desired, the intensity galvanometer can remove some of the laser light so that it does not reach the motion picture screen while allowing perhaps some of the laser light through.

As set forth in more detail below, the galvanometer-based mirror configuration can be enhanced to provide a more sophisticated display from the reflected laser light.

Figure 5:
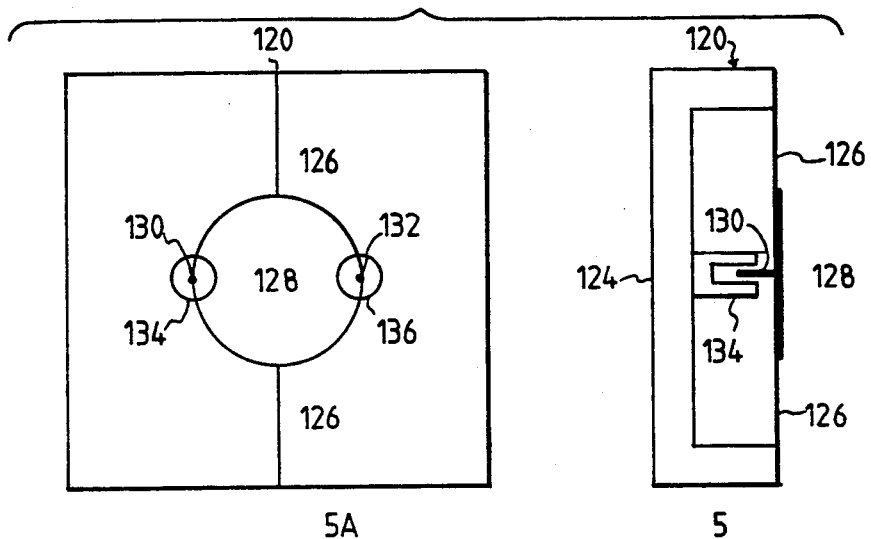
FIG. 5 is an alternate embodiment of the streamer, showing side sectional view of the resonant scanning mirror.
Figure 6:
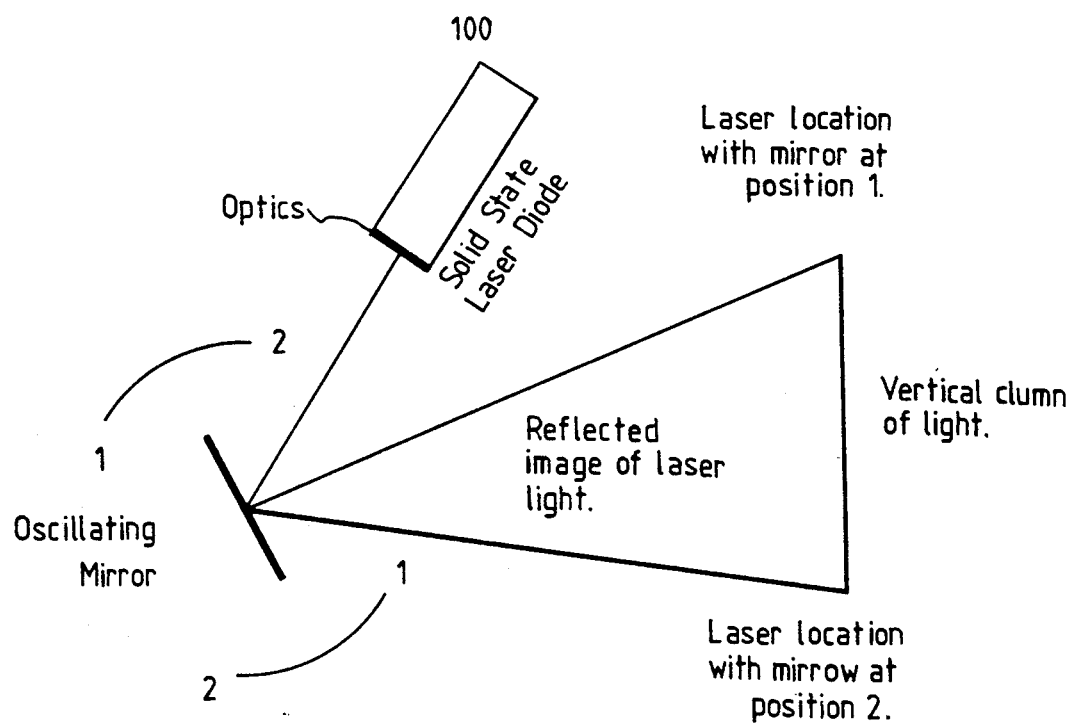
FIG. 6 is an alternate embodiment of the streamer, showing a diagrammatic view of the resonant scanning mirror and laser as a vertical streamer line is generated.
Figure 7:
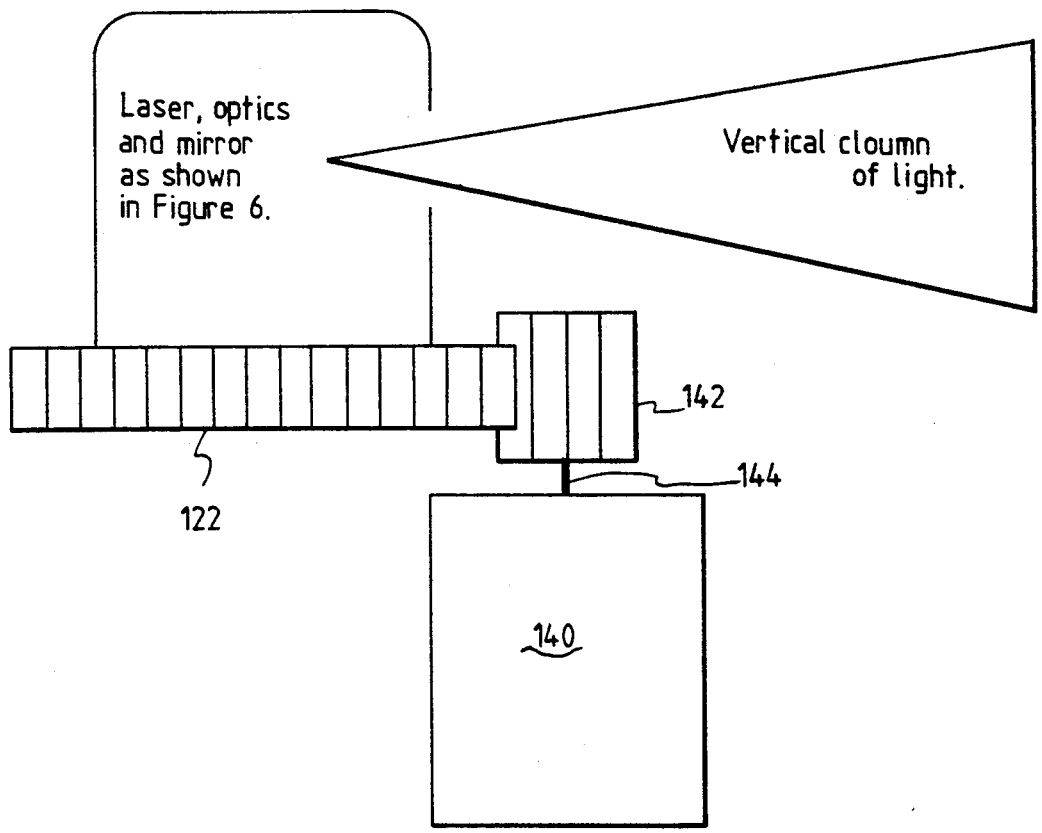
FIG. 7 is an alternate embodiment of the streamer, showing a perspective view of the entire optical apparatus used to generate the vertical streamer line and its motion across the motion picture screen.

Alternatively, instead of using an x-axis galvanometer 88 and a y-axis galvanometer 92 to control the x-axis mirror 94 and the y-axis mirror 98, a resonant scanning mirror 120 can be used that rotates upon a motor-driven spur gear 122 which acts as a turntable. As shown in FIGS. 5-7, the scanning mirror generates the streamer line running from the top of the motion picture screen 102 to the bottom and substitutes for the y-axis mirror 98 and its galvanometer 92. The spur gear 122 rotates the scanning mirror 120 to move the vertical streamer line across the motion picture screen 102.

As shown in FIG. 5 the scanning mirror 120 has a base 124 across which is horizontally strung a torsion spring 126. If the torsion spring 126 is hung vertically, optical adjustments are required to rotate the image of the mirror 90° so that a vertical line may be projected. FIG. 6 shows the laser generation of a vertical streamer line created by the scanning mirror 120. Balanced upon the torsion spring 126 is a mirror 128 that rotates easily about the torsion spring 126. In order to control the motion of the mirror 128 about the torsion spring, the rear of the mirror 128 has two small pieces of iron or other ferromagnetic substance 130, 132 attached. The two pieces of iron 130, 132 are oriented along an axis perpendicular to the torsion spring.

The two iron pieces 130, 132 interact with two corresponding electromagnetic coils 134, 136. In order to oscillate the mirror 128 about the torsion spring 126, the electromagnetic coils 134, 136 are alternatively energized to create alternating magnetic fields The alternating magnetic fields generated by the magnetic coils 134, 136 pull the corresponding iron pieces 130, 132 towards them first on one side of the mirror 128, then on the other. In conjunction with the stiffness of the torsion spring 126, the electromagnetic coils 134, 136 rapidly oscillate the mirror 128 about the torsion spring 126. When the light of a laser or other concentrated light source shines upon the mirror 128, even though the light source is pinpoint in nature, the mirror 128 oscillates so rapidly that the human eye perceives a vertical line of light.

As the resonant scanning mirror 120 creates the vertical streamer line for use in the present invention, means are required to turn the vertical streamer line across the motion picture screen 102 so that the vertical streamer line may act as a visual cue.

In order to move the vertical streamer line across the motion picture screen 102, the scanning mirror 120 is placed atop a spur gear 122 of adequate size to provide sufficient support for the scanning mirror 120. As the mirror 128 oscillates freely from the mirror base 124, it also oscillates freely from the spur gear 122 upon which the mirror base 124 rests. The spur gear 122 is coupled to a stepper motor 140 through a pinion gear 142 attached to the shaft of the stepper motor 144. As the stepper motor 140 turns the pinion gear 142, the spur gear is likewise turned, as is the scanning mirror 120. The stepper motor 140 allows accurate control of the spur gear 122 and scanning mirror 120. Upon drawing the vertical streamer across the motion picture screen 102, the stepper motor quickly returns the scanning mirror 120 to a ready position so that another visual cue may be performed in short order. The laser may also be attached to the spur gear 122 so that it turns with the scanning mirror 120.

Installation and Setup

The installation and setup of the present invention as configured in FIG. 1 is as follows The master control circuit 12 can be configured either as a pass around control pod which would typically sit on or near a mixing console, or as a built in control module typically installed within a mixing console. Synchronization signals 10 in the form of SMPTE time code or tachometer pulses is provided to the master control circuit 12. The slave control 16 and the projection system 18 are typically installed in the projection room and are connected to the master control circuit 12 with a duplex fiber optic communications link 14.

The projection system 18 is suspended by a gimbal joint attached to a wall mounted bracket. This suspension allows for adjusting the projection angle in the up, down, left, and right directions.

Figure 13:
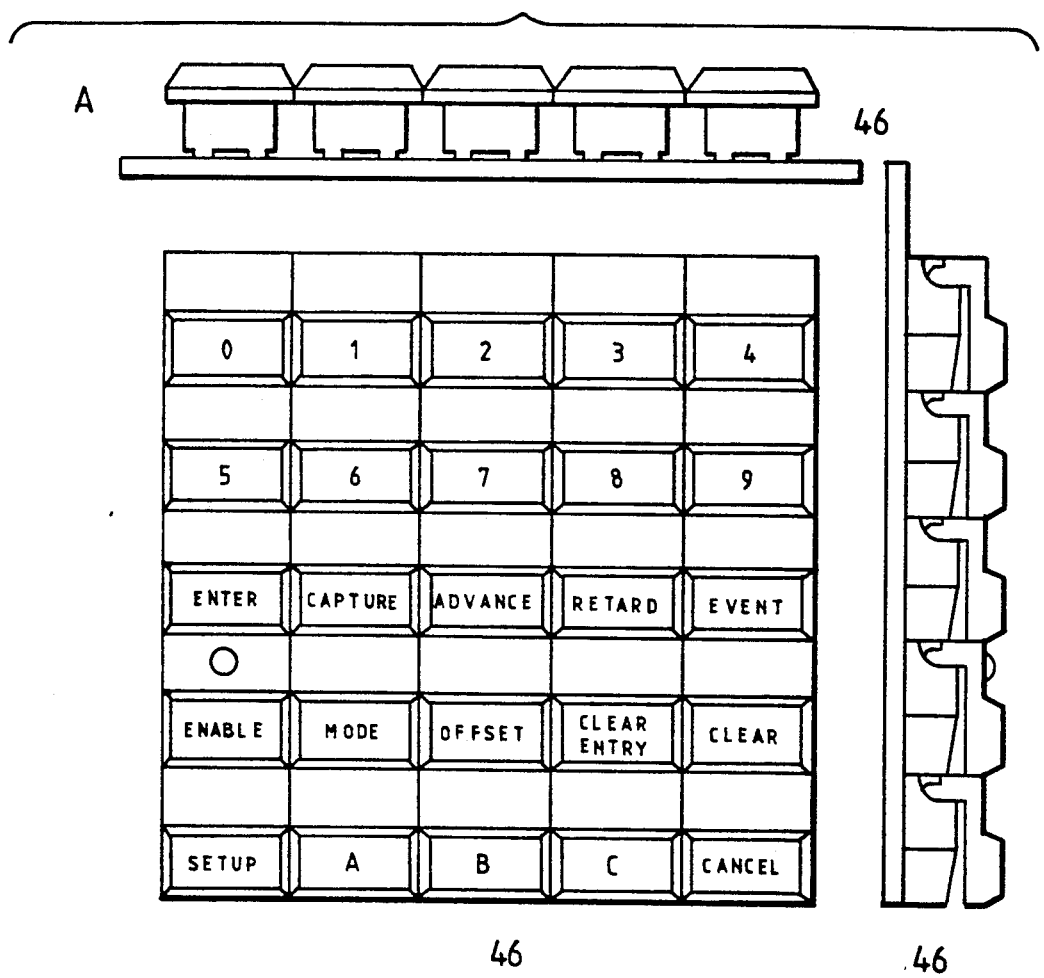
FIG. 13 is a top plan view of the keypad of the present invention.
Figure 14:
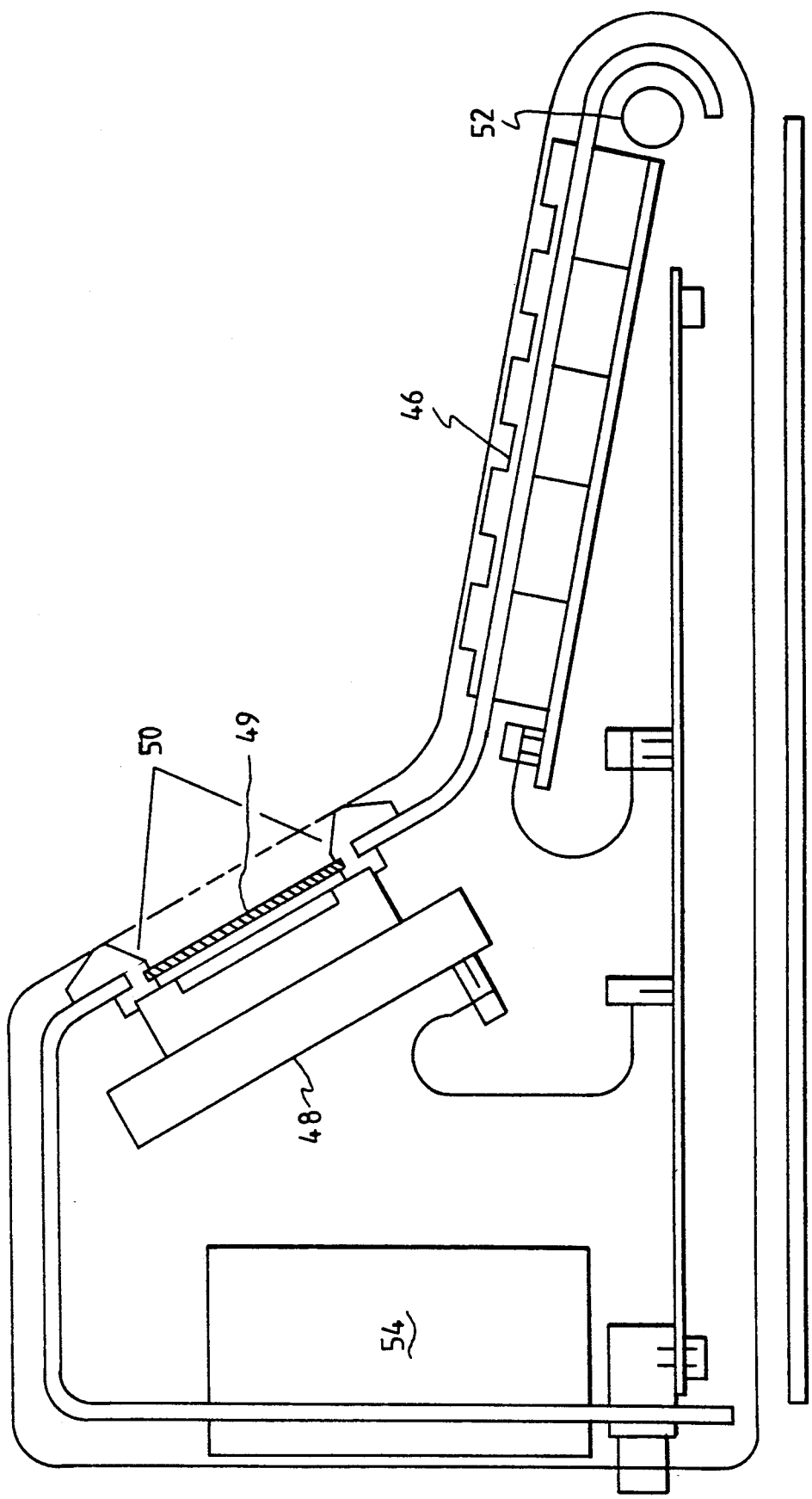
FIG. 14 is a side view of the master electronic control circuitry in its present embodiment. This configuration is used for either the Film Streamer or the Heads Up Projection System.
Figure 15:
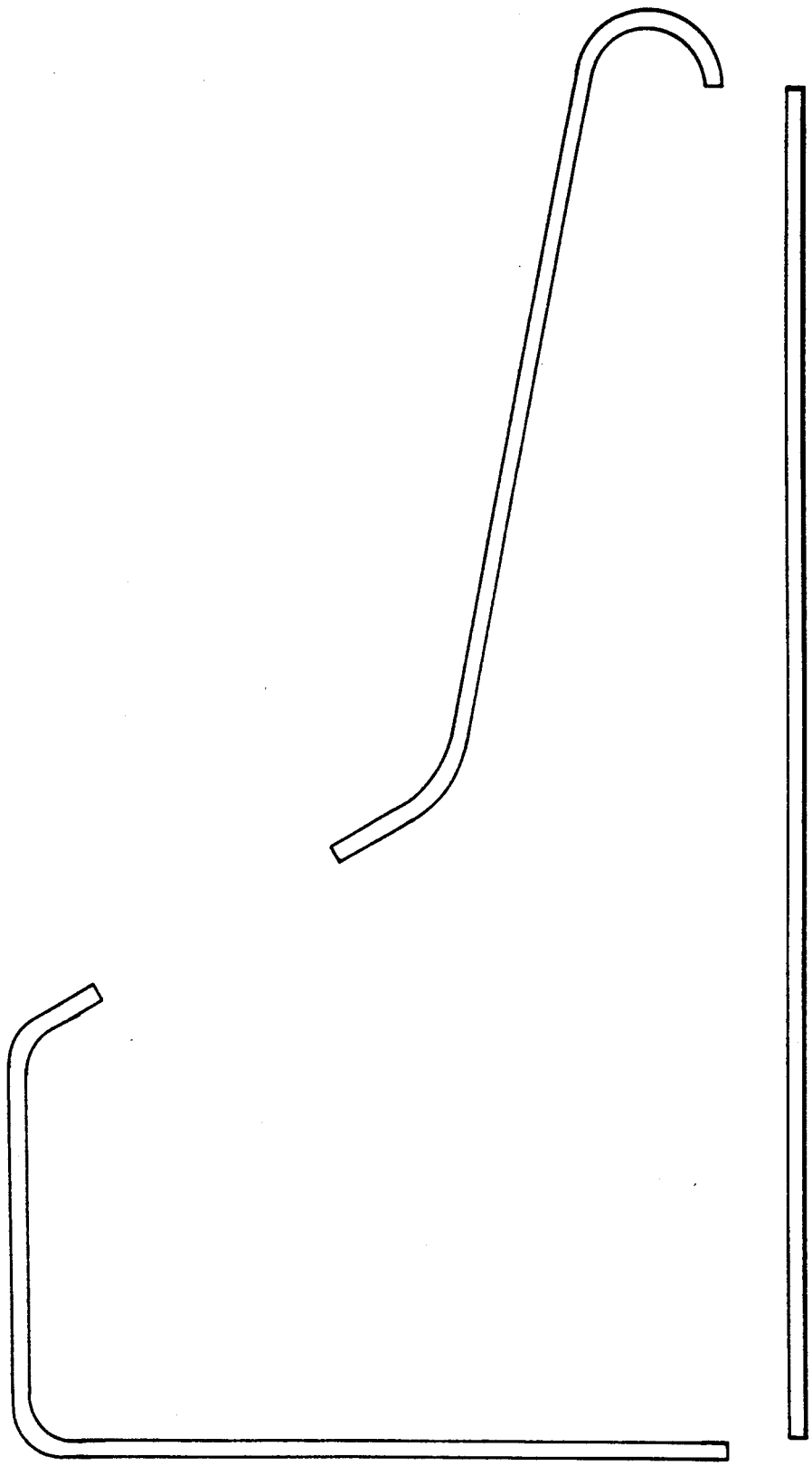
FIG. 15 is a dimensioned side view of the 0.125 inch thick, stamped aluminum panels which comprise the center panels, top and bottom
Figure 16:
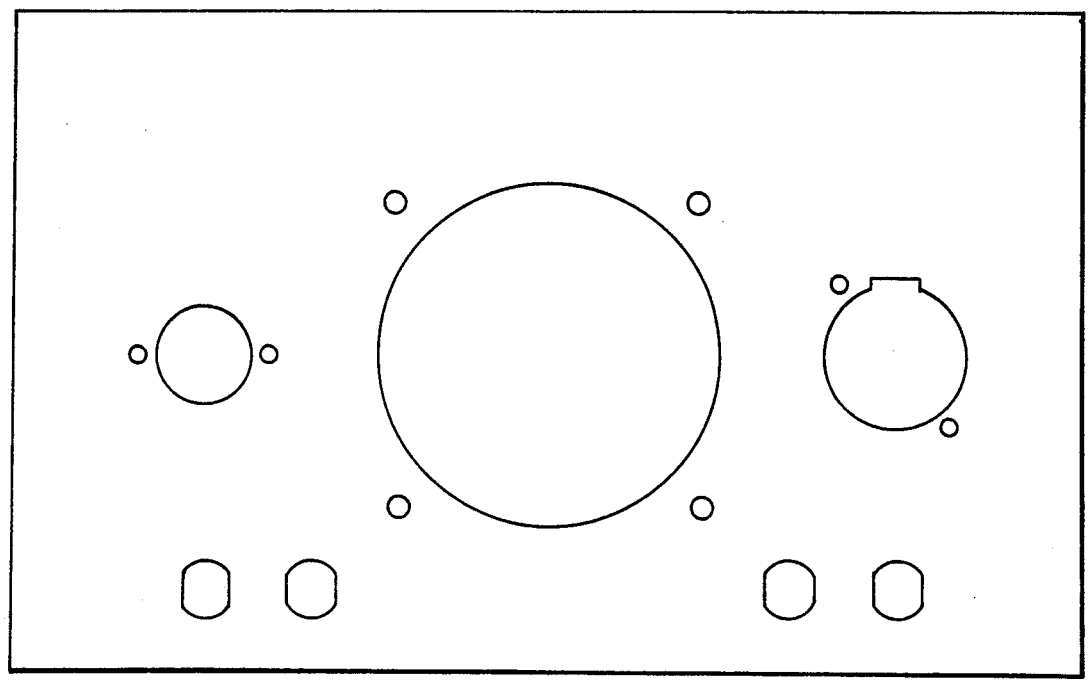
FIG. 16 is rear view of the center top panel showing locations of openings for the fan, power connector, input connector, and fiber optic connectors.
Figure 17:
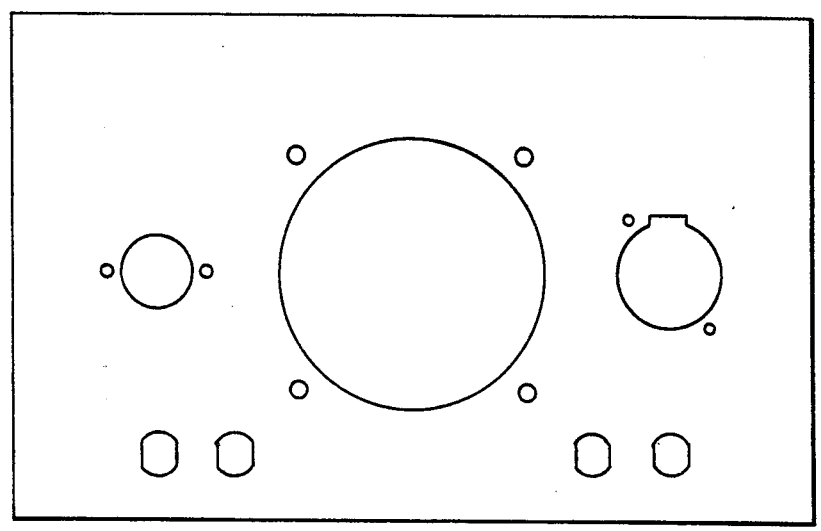
FIG. 17 is a dimensioned rear view of the 0.125 inch thick, stamped aluminum panel which comprises the center top panel.
Figure 18:
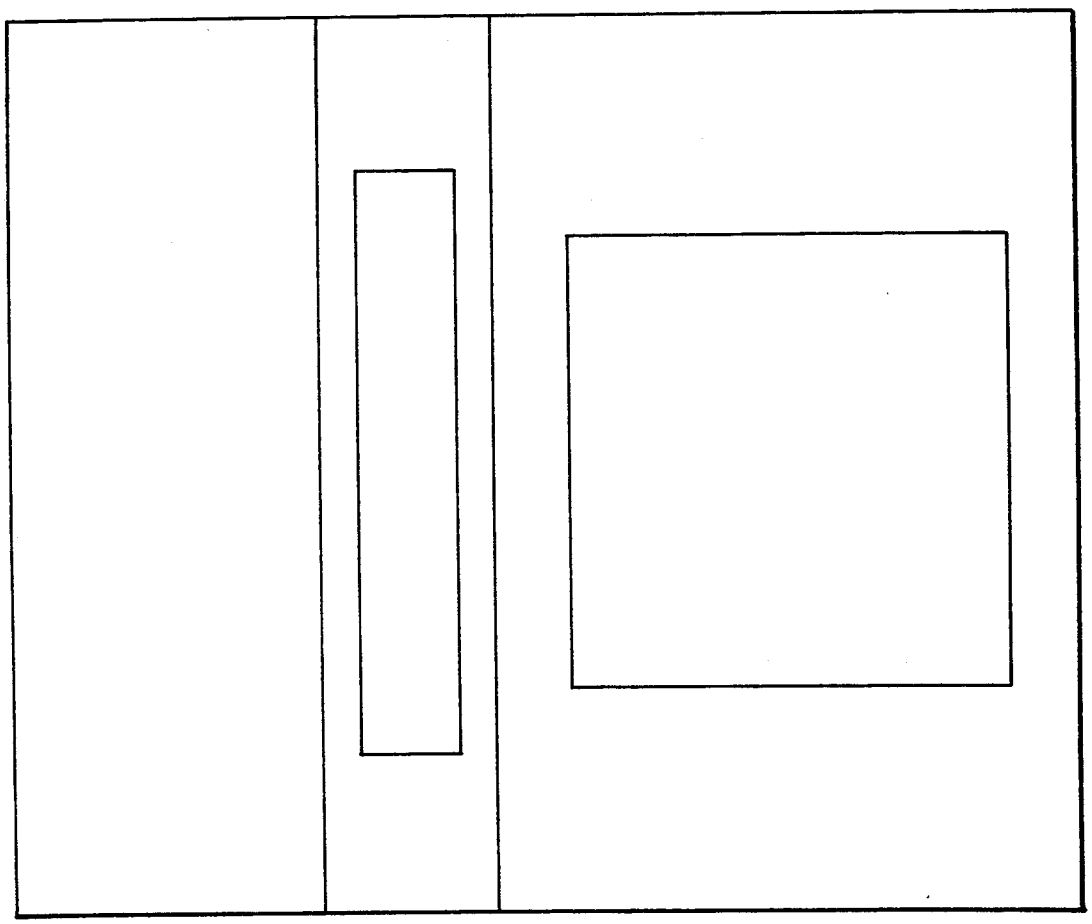
FIG. 18 is a top view of the center top panel showing locations of openings for the display and keypad.
Figure 19:
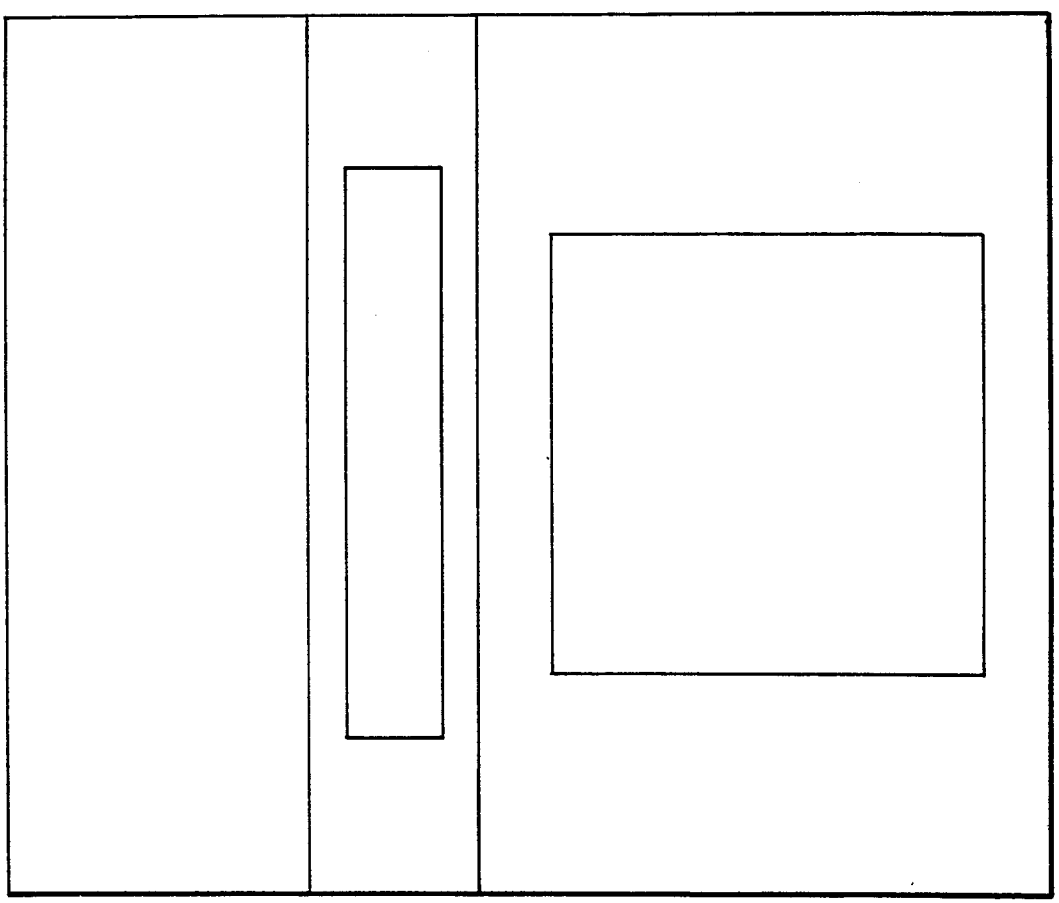
FIG. 19 is a dimensioned top view of the 0.125 inch thick, stamped aluminum panel which comprises the center top panel.

The operator/engineer now presses the SETUP switch located on the keypad 46 which places the present invention in the setup mode of operation. The keypad 46 is shown in FIG. 13. In this mode, the master control circuit 12 commands the slave control 16 to cause the projection system 18 to display two perpendicular lines in an "X" configuration on the motion picture projection screen 102. The operator now adjusts the aspect ratio of the "X" by pressing switches located on the keypad 46 which increase or decrease the aspect ratio, until the lines forming the "X" coincide with the corners of the motion picture projection screen 102. This procedure may require some mechanical adjustment of the gimbal joint as well. When the lines forming the "X" coincide with the corners of the motion picture projection screen 102, the center of the "X" is at the center of the motion picture projection screen 102. The operator presses the ENTER switch located on the keypad 46 and a locking mechanism on the gimbal joint is engaged to secure the position of the projection system 18. At this stage, the present invention knows where the center of the motion picture projection screen 102 is.

The operator now adjusts endpoints of the lines by pressing switches located on the keypad 46 which move the endpoints towards or away from the center of the "X". When the endpoints coincide with the corners of the motion picture projection screen 102, the operator presses the ENTER switch again located on the keypad 46. At this stage, the present invention knows the height and width of the motion picture projection screen. The installation and setup of the present invention is now complete and editing of the projected film can commence with the projection system calibrated for the screen 102.

Operation of the System

The operation of the present invention as configured in FIG. 1 is as follows:

The operator is required to place visual cue points on the motion picture projection screen 102. If a cue sheet, or list of cue points is available, the operator enters the cue points either in the form of SMPTE time code or in the form of footage and frames into the master control circuit 12. This is accomplished interactively through the keypad 46, the keypad decoder 44, the central processing unit 32, the display control 48, and the display 50.

If a cue sheet is not available, the present invention has the capability of capturing the cue point on the fly. As the film rolls by, the operator awaits the cue point. When the cue point occurs, the operator presses the CAPTURE switch located on the keypad 46 and the present invention memorizes that frame number in SMPTE time code or footage and frames by storing the film location code in non volatile ram 30.

In either case, once the cue point or cue points are entered, the operator can continue to fine tune a specific cue point with the ADVANCE and RETARD switches located on the keypad 46. The cue point, shown on the display 50 as an SMPTE time code or in footage and frames, will advance one frame or retard one frame as the respective switch is pressed. All mathematic functions required to carry or borrow frames will be off-loaded by the central processing unit 32 to the math co-processing unit 22

Once the cue points are entered and adjusted, they are automatically saved for future recall in the nonvolatile ram 30. When a cue point approaches during the rolling of the film, an optical cue in the form of a vertical line sweeping from left to right is superimposed upon the image projected by the film. The start of sweep time is defined as the cue point minus the time spent sweeping the streamer (the superimposed vertical line) across the motion picture projection screen 102. Typically, the default sweep rate and default audible tick rate are 3 feet and 3 ticks. However other sweep rates and audible tick rates may be used in the present invention. With these rates selected, the start of sweep would be 2 seconds prior to the cue point.

If when compared to a cue point, the current frame of the running film is one for which a streamer should begin to sweep across the screen, the master control circuit 12 commands the slave control 16 to control the projection system 18 to start sweeping a vertical streamer line horizontally across the motion picture projection screen 102. Coincident with the start of the sweep is a first audible tick (if enabled).

When the first foot of film has advanced, the vertical column of light has traversed one third of the horizontal distance across the motion picture projection screen 102 and a second audible tick occurs. When the second foot of film has advanced, the vertical column of light has traversed two thirds of the horizontal distance across the motion picture projection screen 102 and a third audible tick occurs. When the third and final foot of film has advanced, the vertical column of light has reached the cue point and has traversed three thirds of the horizontal distance across the motion picture projection screen 102. No audible tick occurs at the cue point, as this is where audio recording or other cued event takes place.

Heads Up Projection System

The projection system of the present invention may also be modified so that it not only provides a visual cuing system for the mixing operator/engineer, but also provides important or other useful information useful to the operator/engineer in the mixing process One example of such information is the SMPTE or footage and frame information generated by the central synchronization meter. FIGS. 8-11 show diagrammatically the heads-up projection system.

Figure 8:
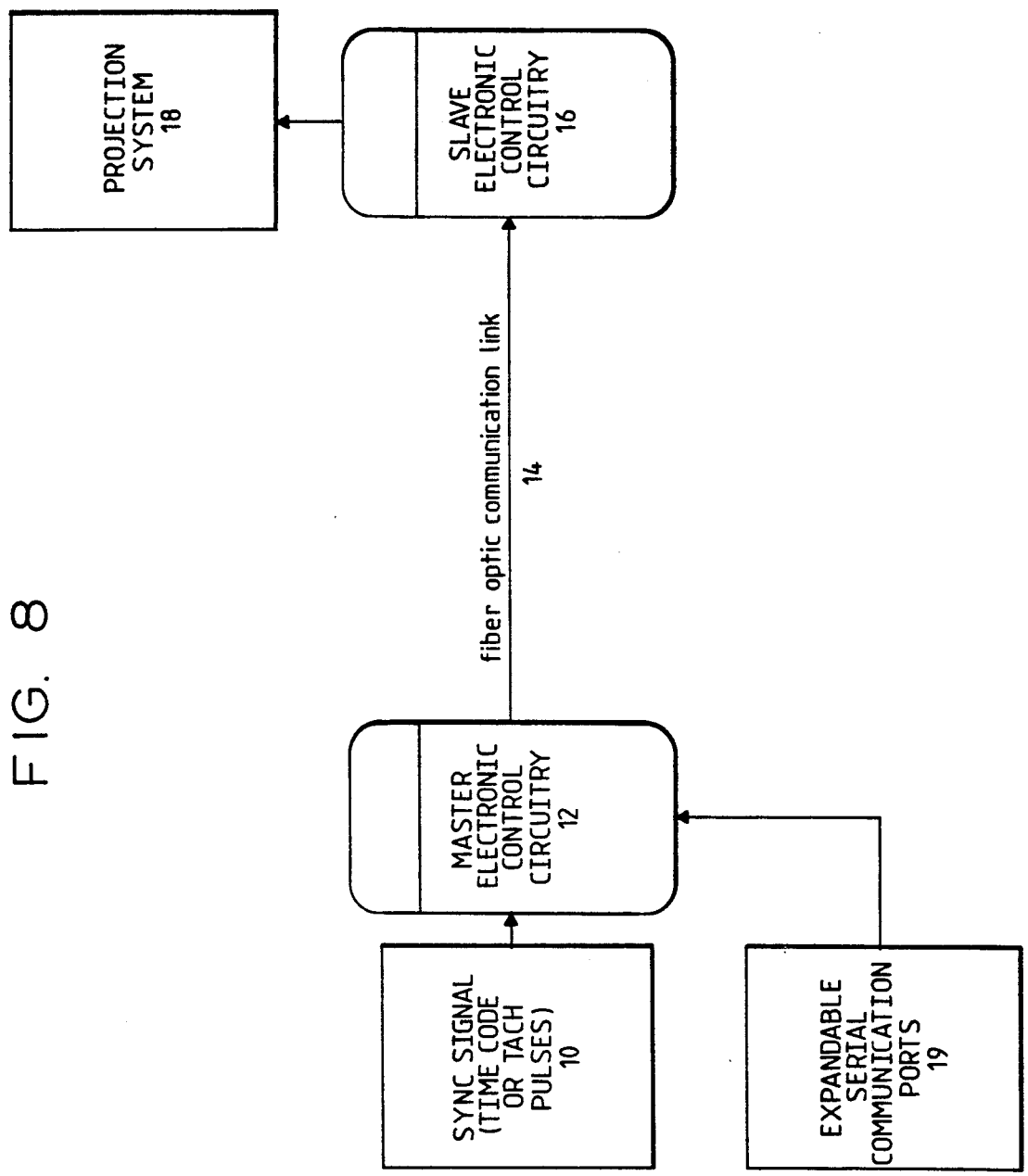
FIG. 8 is a block diagram of the heads-up projection system of the present invention.
Figure 9:
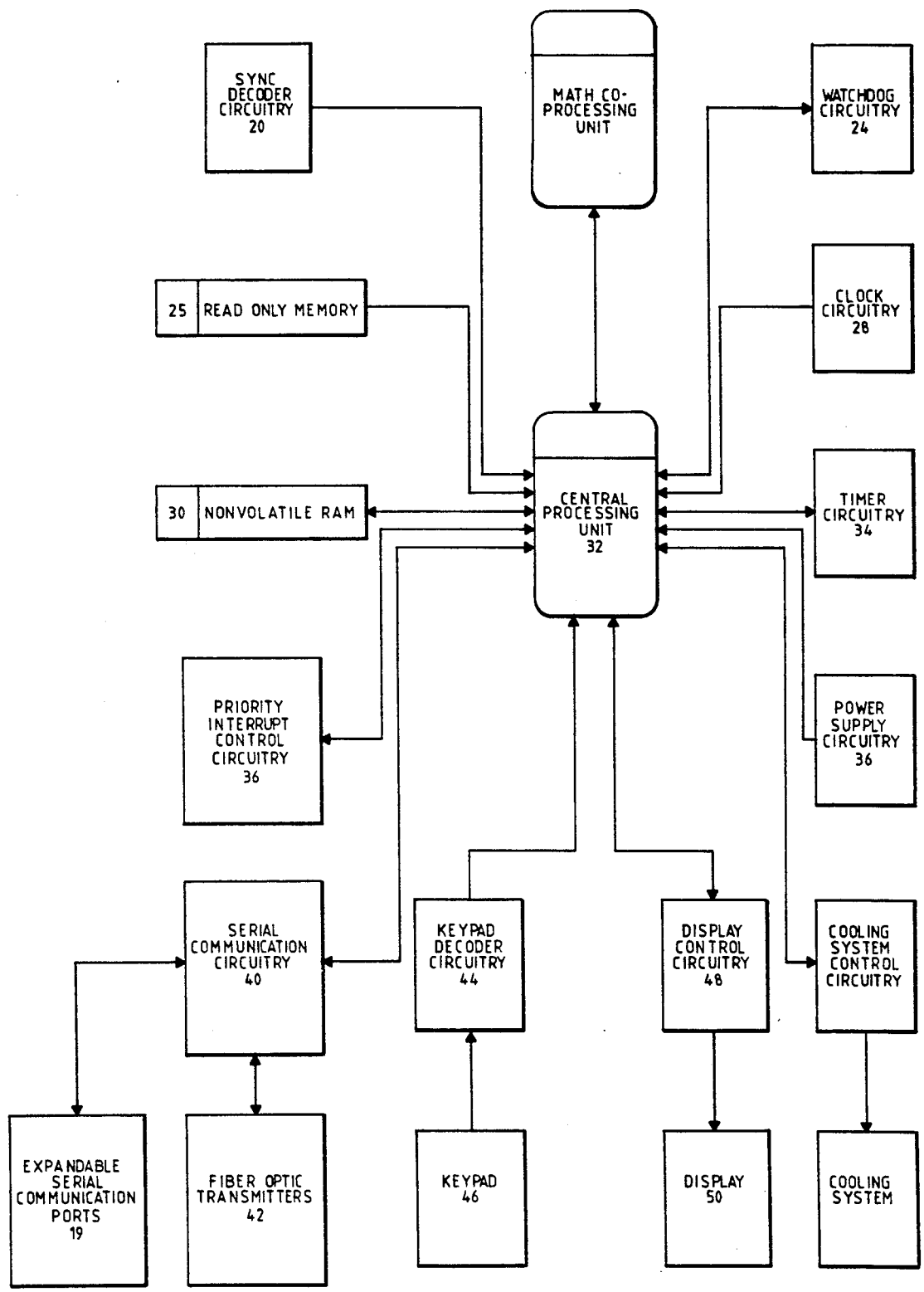
FIG. 9 is a block diagram of the master electronic control circuitry of the heads-up projection system of FIG. 8.
Figure 10:
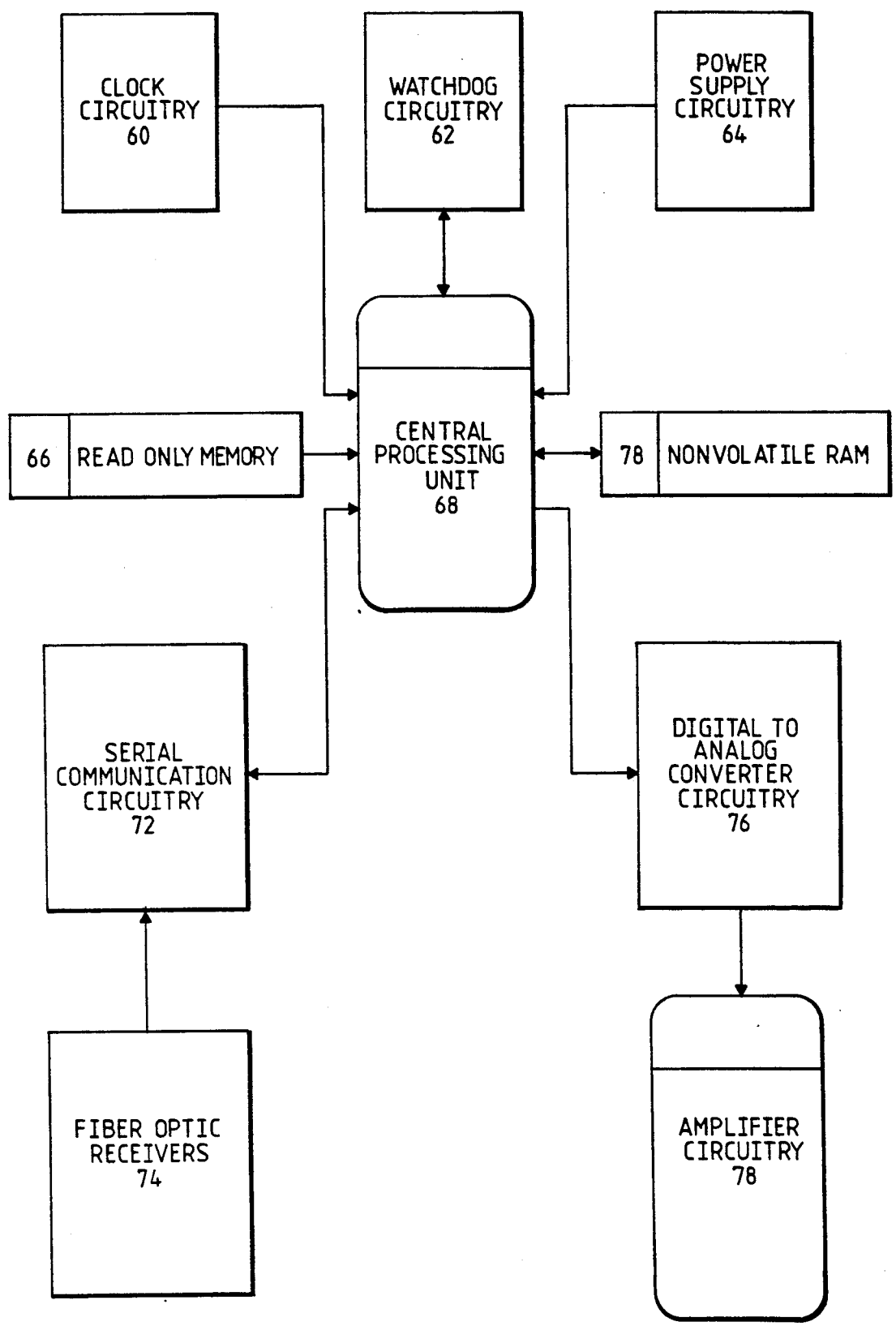
FIG. 10 is a block diagram of the slave electronic control circuitry of the heads-up projector.
Figure 11:
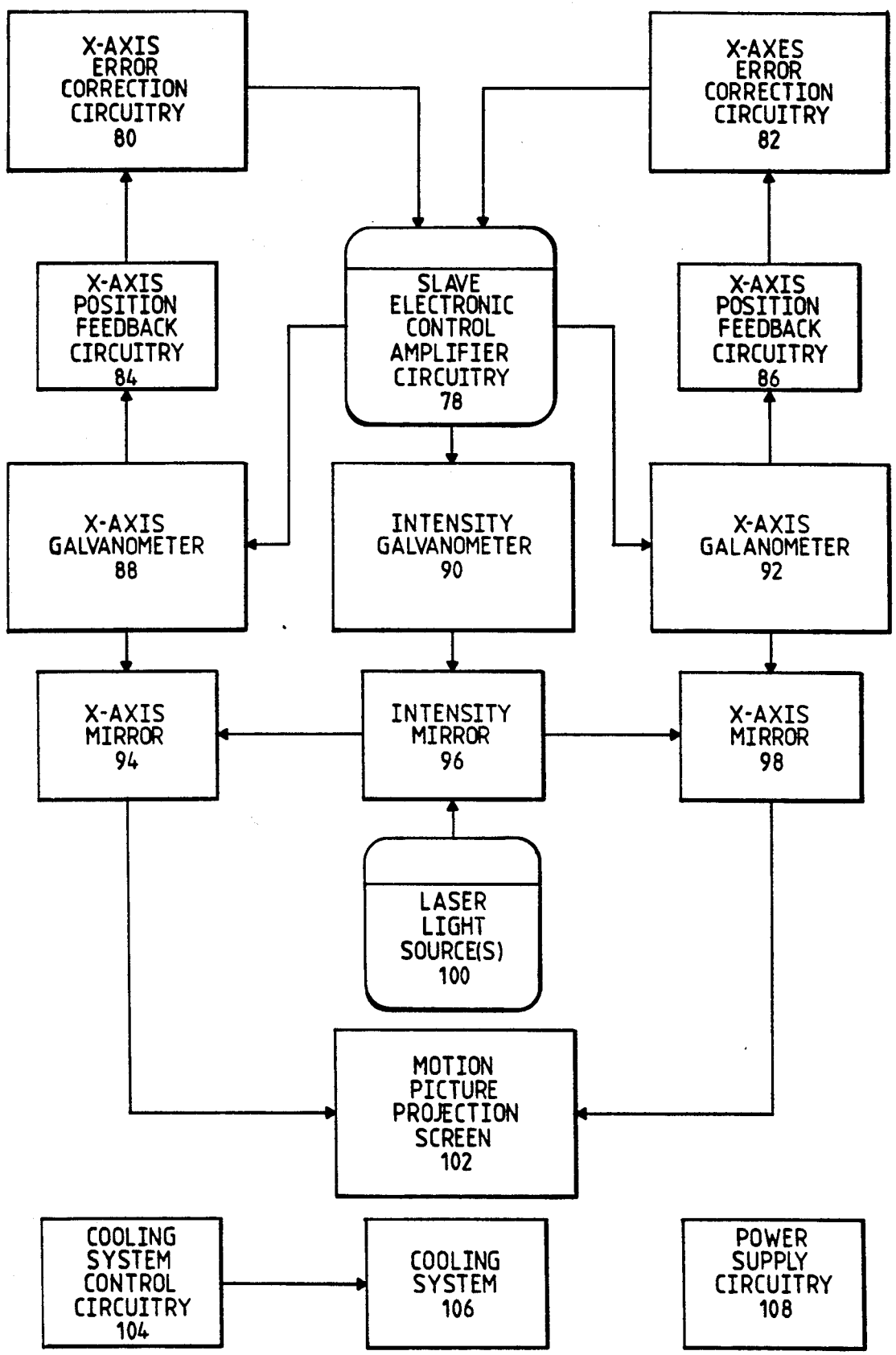
FIG. 11 is a block diagram of the Projection System of the heads-up projector.

In order to supply the present projection control system with the information that is to be displayed, serial communications ports as shown in FIG. 8 and RS232C interface circuitry 19, are added to the master control circuit 12. These additions to the master control 12 allow access to the system of the present invention by any compatible information generation or storage means. When presented to the master control 12 through the serial communications ports and the RS232C interface circuitry, the information to be displayed is incorporated into the signals transmitted from the master control 12 to the slave control 16. In almost all other aspects, the operation of the heads up projection system is similar if not the same as the operation of the film cuing system.

In response to the signals sent from the master control 12, the slave control 16 drives the x-axis 88, y-axis 92, and intensity 90 galvanometers so that the information to be displayed as indicated by the master control signals is indeed displayed. As for the generation of the vertical streamer line, above, the galvanometer-based mirror system can generate letters, numbers, and FIGURE displays according to the signals impressed upon them. For example, if the SMPTE time code is to be displayed, the letters and numbers would be scanned across the screen with the intensity mirror 96 and intensity galvanometer 90 preventing the transmission of laser light to the motion picture screen 102 when the laser light is moving from one letter to another.

The density of information that can be projected by the present system is limited only by the brightness of the laser and the dynamic response of the galvanometers. If the laser is insufficiently bright, the letters will fade as the light is being distributed over too much of the screen at once by the galvanometers and their mirrors If the galvanometers do not respond quickly enough, the elements of the display (letters, numbers, FIGURES, etc.) become less well-defined and can run into each other.

While the present invention has been described with regards to particular embodiments, it is recognized that additional variations of the present invention may be devised without departing from the inventive concept.

While in the preferred embodiment of the present invention the source of projected light is a laser, it is contemplated that other bright light sources could also be used. For example, vacuum fluorescent lights, LCD displays or other light sources that are capable of displaying a distinct, focussed light on the projection screen could be used in place of the laser light source.

Also, while in the preferred embodiment of the present invention a vertical column of light, moving across the screen is displayed on the projection screen for the cuing operation, it is appreciated that any number of other visual displays could equally be displayed on the screen without departing from the concept of the present invention. For example, the cue line could be horizontal, moving from either the top to the bottom, diagonal, moving from one corner of the screen to the other, a series of circles moving across the screen. As long as the pattern and final position of the cue signal is known, so that there is predictability, the visual display projected on the screen is sufficient for the purposes of conveying the cuing information to the film editor. Further, the cuing signals use a numerical countdown, i.e; 10,9,8,7..., projected onto the screen itself

What I claim is:

1. A projection system for the visual presentation of cues or other information during editing of motion picture film, comprising:
   a source of synchronization signals, said synchronization signals indicating a position of the s motion picture film;
   a master control circuit coupled to said source of synchronization signals, said master control circuit enabling operator input to the master control circuit coordinating said input with said synchronization signals and said film position;
   a slave control circuit coupled to said master control circuit, said slave control circuit receiving commands and data from said master control circuit and converting said master control signals into signals acceptable as input for electromechanical projection devices; and
   a projection system coupled to said slave control circuit, said projection system receiving control signals from said slave control circuit and responding by projecting an image upon a projection screen.

2. The projection system of claim wherein said synchronization signals comprise SMPTE signals.

3. The projection system of claim 1, wherein said synchronization signals comprise film tachometer signals.

4. The projection system of claim 1, wherein said master control circuit comprises:
   a central processing unit; and
   a synchronization signal decoder circuit coupled to said central processing unit.

5. The projection system of claim 4, wherein said master control circuit further comprises
   a math coprocessing unit coupled to said central processing unit;
   a watchdog circuit coupled to said central processing unit;
   a clock circuit coupled to said central processing unit;
   a timer circuit coupled to said central processing unit;
   a power supply coupled to said central processing unit;
   a display control and operator display coupled to said central processing unit;
   a keypad decoder and operator keypad coupled to said central processing unit;
   a serial communications circuit and fiber optic transmitter coupled to said central processing unit;
   a priority interrupt control coupled to said central processing unit;
   nonvolatile random access memory (RAM) coupled to said central processing unit; and
   read only memory (ROM) coupled to said central processing unit.

6. The projection system of claim 1, wherein said slave control circuit comprises:
   a central processing unit; and
   a digital signal to analog signal converter coupled to said central processing unit.

7. The projection system of claim 6, wherein said slave control circuit further comprises:
   a clock circuit coupled to said central processing unit.,
   a watchdog circuit coupled to said central processing unit;
   a power supply coupled to said central processing unit;
   nonvolatile random access memory (RAM) coupled to analog signal converter;
   an amplifier circuit coupled to said digital to analog signal converter;
   a serial communications circuit and fiber optic read only memory (ROM) coupled to said central processing unit.

8. The projection system of claim 1, wherein said projection system comprises:
   a projection screen; and
   a projector for projecting an image upon said projection screen.

9. The projection system of claim 8, wherein said projector comprises:
   a source of light;
   a mirror reflecting light from said light source, said mirror capable of controllably oscillating along a horizontal axis so that said reflected light moves vertically; and
   a turntable, said mirror coupled to said turntable so that when said turntable turns, said reflected light moves horizontally.

10. The projection system of claim 8, wherein said projector comprises:
    a source of light;
    an x-axis galvanometer coupled to said slave control circuit;
    an x-axis mirror coupled to said x-axis galvanometer;
    an x-axis position feedback circuit coupled to said x-axis galvanometer;
    an x-axis error correction circuit coupled to said x-axis position feedback circuit and coupled to said slave control circuit;
    a y-axis galvanometer coupled to said slave control circuit;
    a y-axis mirror coupled to said y-axis galvanometer;
    a y-axis position feedback circuit coupled to said y-axis galvanometer;
    a y-axis error correction circuit coupled to said y-axis position feedback circuit and coupled to said slave control circuit;
    an intensity galvanometer coupled to said slave control circuit; and
    an intensity mirror coupled to said intensity galvanometer.

11. The projection system of claim 1, wherein said master control circuit and said slave control circuit are coupled by fiber optics.

12. A film streamer for the visual presentation of cues or other information during editing of motion picture film, comprising:
    a source of synchronization signals, said synchronization signals indicating a position of the motion picture film;
    a master control circuit coupled to said source of synchronization signals, said master control circuit enabling operator input to the film streamer and coordinating said input with said synchronization signals and said film position, said master control circuit comprising:
    a central processing unit;
    a synchronization signal decoder circuit coupled to said central processing unit
    a math coprocessing unit coupled to said central processing unit;
    a watchdog circuit coupled to said central processing unit;

a clock circuit coupled to said central processing unit;

a timer circuit coupled to said central processing unit;

a power supply coupled to said central processing unit;

a display control and operator display coupled to said central processing unit;

a keypad decoder and operator keypad coupled to said central processing unit;

a serial communications circuit and fiber optic transmitter coupled to said central processing unit;

a priority interrupt control coupled to said central processing unit;

nonvolatile random access memory (RAM) coupled to said central processing unit; and read only memory (ROM) coupled to said central processing unit;

a slave control circuit coupled to said master control circuit, said slave control circuit receiving commands and data from said master control circuit and converting said master control signals into signals acceptable as input for electromechanical projection devices, said slave control circuit comprising:

a central processing unit; and a digital signal to analog signal converter coupled to said central processing unit;

a clock circuit coupled to said central processing unit;

a watchdog circuit coupled to said central processing unit a power supply coupled to said central processing unit;

nonvolatile random access memory (RAM) coupled to said central processing unit;

an amplifier circuit coupled to said digital to analog signal converter;

a serial communications circuit and fiber optic receiver coupled to said central processing unit; and read only memory (ROM) coupled to said central processing unit; and a projection system coupled to said slave control circuit by fiber optics, said projection system receiving control signals from said slave control circuit and responding by projecting an image upon a projection screen, said projection system comprising:

a projection screen; and a source of light;

a mirror reflecting light from said light source, said mirror capable of controllably oscillating along a horizontal axis so that said reflected light moves vertically; and a turntable, said mirror coupled to said turntable so that when said turntable turns, said reflected light moves horizontally.

13. The projection system of claim 12, wherein said synchronization signals comprise SMPTE signals.

14. The projection system of claim 12, wherein said synchronization signals comprise film tachometer signals.

15. A film streamer for the visual presentation of cues or other information during editing of motion picture film, comprising:

a source of synchronization signals, said synchronization signals indicating a position of the motion picture film;

a master control circuit coupled to said source of synchronization signals, said master control circuit enabling operator input to the film streamer and coordinating said input with said synchronization signals and said film position, said master control circuit comprising:

a central processing unit;

a synchronization signal decoder circuit coupled to said central processing unit;

a math coprocessing unit coupled to said central processing unit;

a watchdog circuit coupled to said central processing unit;

a clock circuit coupled to said central processing unit;

a timer circuit coupled to said central processing unit;

a power supply coupled to said central processing unit;

a display control and operator display coupled to said central processing unit;

a keypad decoder and operator keypad coupled to said central processing unit;

a serial communications circuit and fiber optic transmitter coupled to said central processing unit;

a priority interrupt control coupled to said central processing unit;

nonvolatile random access memory (RAM) coupled to said central processing unit; and read only memory (ROM) coupled to said central processing unit;

a slave control circuit coupled to said master control circuit, said slave control circuit receiving commands and data from said master control circuit and acceptable as input for electromechanical projection devices, said slave control circuit comprising:

a central processing unit; and a digital signal to analog signal converter coupled to said central processing unit;

a clock circuit coupled to said central processing unit;

a watchdog circuit coupled to said central processing unit;

a power supply coupled to said central processing unit;

nonvolatile random access memory (RAM) coupled to said central processing unit;

an amplifier circuit coupled to said digital to analog signal converter;

a serial communications circuit and fiber optic receiver coupled to said central processing unit; and read only memory (ROM) coupled to said central processing unit; and a projection system coupled to said slave control circuit by fiber optics, said projection system receiving control signals from said slave control circuit and responding by projecting an image upon a projection screen, said projection system comprising:

a source of light;

an x-axis galvanometer coupled to said slave control circuit;

an x-axis mirror coupled to said x-axis galvanometer;

an x-axis position feedback circuit coupled to said x-axis galvanometer;

an x-axis error correction circuit coupled to said x-axis position feedback circuit and coupled to said slave control circuit;

a y-axis galvanometer coupled to said slave control circuit;

a y-axis mirror coupled to said y-axis galvanometer;

a y-axis position feedback circuit coupled to said y-axis galvanometer;

a y-axis error correction circuit coupled to said y-axis position feedback circuit and couple to said slave control circuit;

an intensity galvanometer coupled to said slave control circuit; and an intensity mirror coupled t said intensity galvanometer.

16. The projection system of claim 15, wherein said synchronization signals comprise SMPTE signals.

17. The projection system of claim 15, wherein said synchronization signals comprise film tachometer signals.

* * * * *